(12) United States Patent
Venrooij et al.

(10) Patent No.: US 6,179,599 B1
(45) Date of Patent: Jan. 30, 2001

(54) SEALING EJECTOR PIN

(75) Inventors: Johannes Lambertus Gerardus Maria Venrooij, BM Duiven; Marcel Gerardus Antonius Tomassen, EC Zevenaar, both of (NL)

(73) Assignee: FICO B.V. (NL)

(*) Notice: Under 35 U.S.C. 154(b), the term of this patent shall be extended for 0 days.

(21) Appl. No.: 09/269,984

(22) PCT Filed: Nov. 4, 1997

(86) PCT No.: PCT/NL97/00603

§ 371 Date: Apr. 5, 1999

§ 102(e) Date: Apr. 5, 1999

(87) PCT Pub. No.: WO98/19845

PCT Pub. Date: May 14, 1998

(30) Foreign Application Priority Data

Nov. 6, 1996 (NL) .................................................... 1004460

(51) Int. Cl.$^7$ ............................ B29C 45/02; B29C 45/40
(52) U.S. Cl. .......................... 425/116; 425/125; 425/444; 425/556; 425/577; 425/DIG. 47
(58) Field of Search ........................ 249/67; 264/272.15, 264/39; 425/116, 125, 129.1, 544, 444, 556, 577, DIG. 228, DIG. 47

(56) References Cited

U.S. PATENT DOCUMENTS

| | | | |
|---|---|---|---|
| 3,897,929 | * 8/1975 | Hartmann | 249/67 |
| 5,639,488 | * 6/1997 | Nakano et al. | 425/444 |
| 5,834,035 | * 11/1998 | Osada et al. | 425/116 |

FOREIGN PATENT DOCUMENTS

| | | |
|---|---|---|
| 2029314 | 1/1990 | (JP) . |
| 3258519 | 11/1991 | (JP) . |
| 5096583 | 4/1993 | (JP) . |
| 9531004 | 11/1995 | (WO) . |

* cited by examiner

Primary Examiner—Harold Pyon
Assistant Examiner—Thukhanh T. Nguyen
(74) Attorney, Agent, or Firm—Webb Zieisenheim Logsdon Orkin & Hanson, P.C.

(57) ABSTRACT

The invention relates to an ejector pin receivable in a mold part of a mold for encapsulating electronic components mounted on a carrier, wherein the substantially cylindrical ejector pin is provided with a side wall in which at least one recess is arranged close to the end which makes contact with the product for ejecting. The invention also relates to a mold part in which an opening is arranged for guiding an ejector pin, wherein at least one recess is arranged in the wall of the opening. The invention further includes a mold for encapsulating electronic components, in addition to a method for sealing an interspace between an ejector pin and an opening in a mold part.

5 Claims, 3 Drawing Sheets

SEALING EJECTOR PIN

BACKGROUND OF THE INVENTION

1. Field of the Invention

The invention relates to an ejector pin receivable in a mould part of a mould for encapsulating electronic components mounted on a carrier. The invention also includes a mould part of a mould and a mould for encapsulating electronic components mounted on a carrier and a method for sealing an interspace formed by an ejector pin received in an opening in a mould part of a mould for encapsulating electronic components mounted on a carrier.

2. Description of the Prior Art

When encapsulating electronic components, such as for instance lead frames, mounted on a carrier, it is important that the encapsulating material completely fills a mould cavity during the encapsulating process. It is also important that the encapsulating material adheres firmly to the carrier after the encapsulating process, this to prevent release of the encapsulating material from the carrier. After an encapsulating process the encapsulated product must be removed from an opened mould. In order to facilitate the release and subsequent removal of the encapsulated product from the mould, existing moulds are usually provided with ejector pins. The drawback of using ejector pins in a mould is that encapsulating material can enter the space between an ejector pin and a mould part, whereby the relevant ejector pin becomes jammed in the mould or is less easily movable. This problem becomes even more relevant in the encapsulation of electronic components mounted on so-called BGAs (Ball Grid Arrays), wherein the moulding can only adhere to one side of the carrier. The encapsulating materials developed for this purpose adhere more strongly to the carrier than the encapsulating materials used with the conventional lead frames but therein also increase the danger of one or more ejector pins jamming in a mould.

SUMMARY OF THE INVENTION

The present invention has for its object to provide an improved ejector pin, mould part and mould, in addition to a method with which the chance of an ejector pin jamming in a mould can be considerably reduced.

To this end the invention provides an ejector pin receivable in a mould part of a mould for encapsulating electronic components mounted on a carrier, wherein the substantially cylindrical ejector pin is provided with a side wall in which at least one recess is arranged close to the end which makes contact with the product for ejecting.

The recess is preferably at least one annular groove running round the ejector pin. It is also possible herein that the recess comprises at least one channel running from the annular groove to the end of the ejector pin making contact with a product for ejecting. Due to the recess in the ejector pin the encapsulating material which penetrates between the ejector pin and the opening in which the ejector pin is guided will flow at least partially into the recess. After a few encapsulating processes the recess will therefore be completely filled with encapsulating material, which encapsulating material will also cure after a time. This cured encapsulating material is rigidly connected to the ejector pin since it adheres onto the recess in the ejector pin. The encapsulating material thus rigidly connected to the ejector pin therein functions as seal, so that no more encapsulating material can penetrate into the interspace. In the case of wear of the encapsulating material or the opening into which the ejector pin is guided new encapsulating material will be supplied which will subsequently adhere to the encapsulating material already rigidly connected to the ejector pin. After a time this new encapsulating material will cure so that the seal is again adapted to the changed conditions. This manner of sealing the interspace requires few constructive measures and, very importantly, requires practically no maintenance during encapsulation of products since the seal is self-regulating. The shape of the recess in the ejector pin depends on the dimensions of the ejector pin and guide opening and also depends on the encapsulating material in use. Particularly favourable results are obtained with an annular recess, also because incomplete sealing of the interspace can hereby be realized. For the purpose of filling the recess in the ejector pin in a short time, channels can be arranged with which encapsulating material is carried to the recess.

The present invention also relates to a mould part of a mould for encapsulating electronic components mounted on a carrier, which mould part is provided with at least one substantially cylindrical opening for guiding an ejector pin, wherein at least one recess is arranged in the wall of the opening. The recess is herein at least one annular groove running round the wall of the opening. It is also possible that the wall of the opening comprises at least one channel which connects the annular groove to a surface of the mould part at least partially co-defining a mould cavity. Using such a mould part it is possible to realize a seal in the interspace formed by ejector pin and opening in the mould part by means of encapsulating material which enters the interspace and flows into the recess in the opening of the mould part. Analogous to the discussion of the above described ejector pin, the encapsulating material will cure in the interspace, wherein it is however not rigidly connected to the ejector pin but to the mould part. When the ejector pin moves, the seal formed by cured encapsulating material will not therefore co-displace when the recess is situated in the opening of a mould part. In the case of the mould part favourable results are also obtained with a recess consisting of at least one annular groove running round the wall of the opening. For a rapid filling of the annular groove at least one channel can herein also be provided which connects the annular groove to the mould cavity into which the encapsulating material is introduced.

The invention also includes a mould in which is situated at least one ejector pin and/or mould part according to the invention. It is noted herein that it is also possible to realize a double seal, wherein a recess is arranged in the opening as well as in the ejector pin. In such a construction at least two seals formed by curing encapsulating material will be created, wherein one is rigidly connected to the opening and one is rigidly connected to the ejector pin. In the placing of the recesses the stroke length through which the ejector pin travels must then be taken into account, since the two cured encapsulating material portions may not obstruct each other during the stroke.

Finally, the invention also includes a method for sealing an interspace formed by an ejector pin received in an opening in a mould part of a mould for encapsulating electronic components mounted on a carrier, comprising the steps of:

introducing viscous encapsulating material into a mould cavity at least partially co-defined by the mould part;

admitting a portion of the encapsulating material between the ejector pin and the mould part such that a recess in the ejector pin and/or a recess in the opening in the mould part is filled therewith; and causing the encapsulating material to cure in the recess so that the cured encapsulating material forms a seal.

Using this method, a seal can be realized in the interspace in very simple manner, as already elucidated in the foregoing.

DETAILED DESCRIPTION OF THE PREFERRED EMBODIMENT

Figure 1:
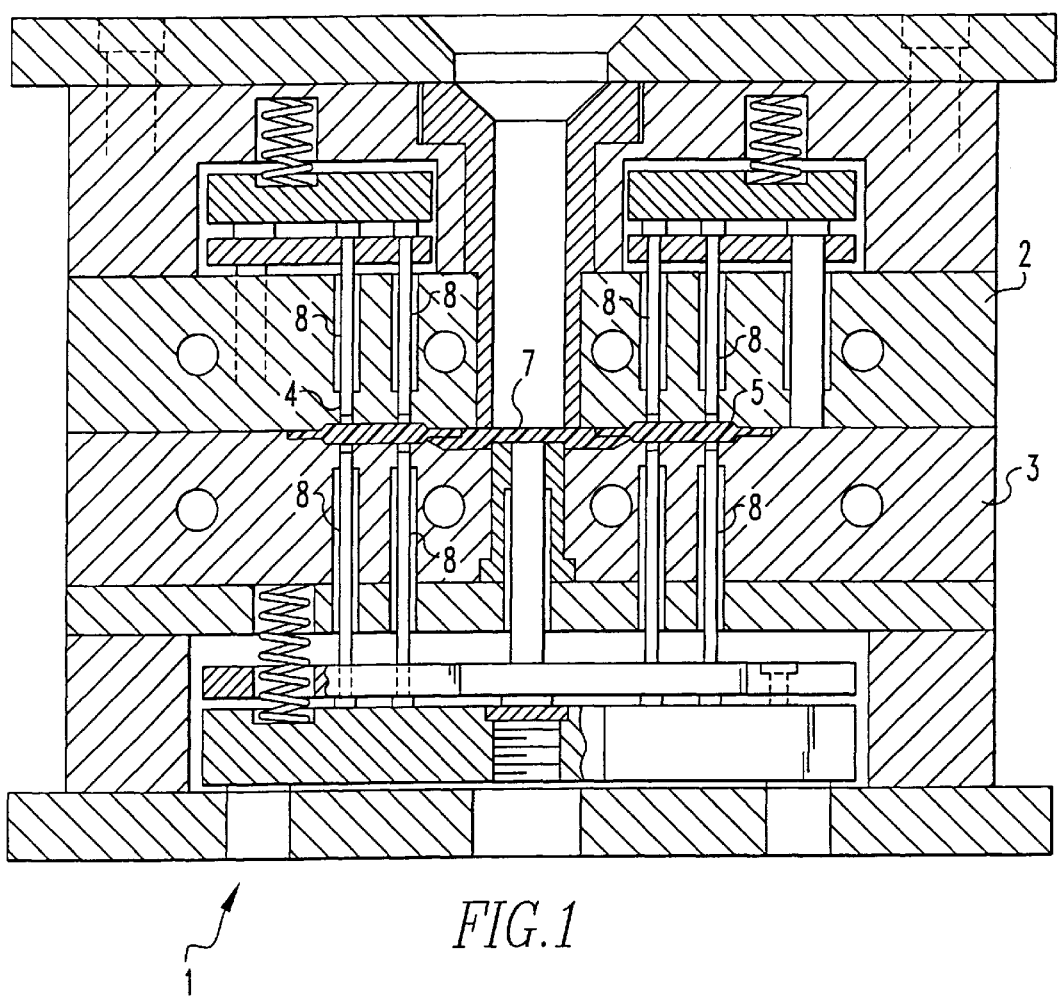
FIG. 1 shows a cross-section through a schematically represented encapsulating device for encapsulating electronic components.

FIG. 1 shows an encapsulating device 1 in which two mould halves 2,3 are arranged. Mould halves 2,3 enclose two mould cavities 4,5 into which encapsulating material 7 is introduced by means of a plunger 6. Situated in mould halves 2,3 are ejector pins 8 with which an encapsulated product can be pushed out of mould cavities 4,5 after the encapsulating process.

Figure 2:
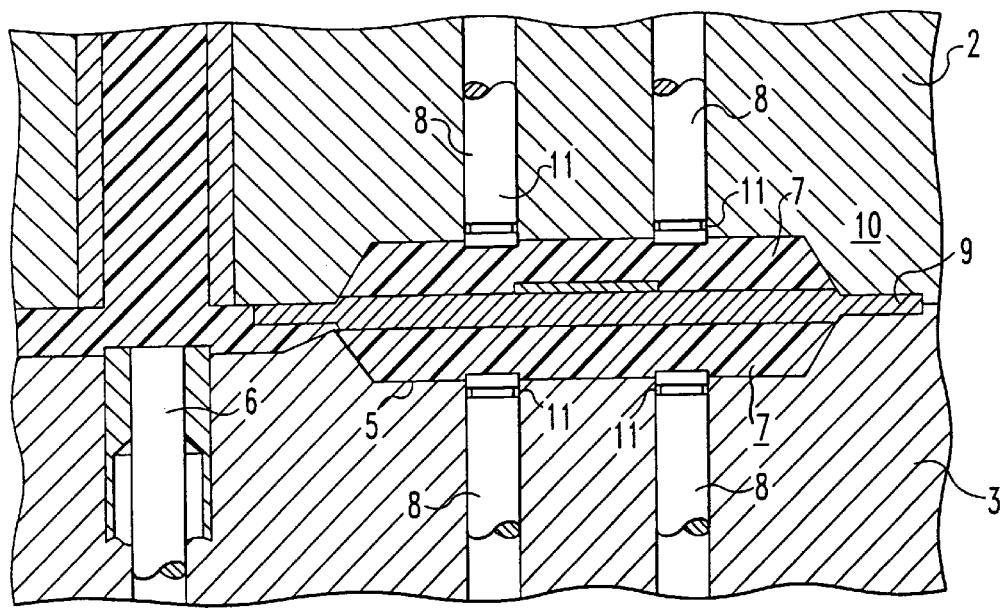
FIG. 2 shows a cross-section through a mould according to the invention during the encapsulating process.

FIG. 2 shows in more detail a part of the mould halves 2,3 between which a lead frame 9 is clamped. Mounted on lead frame 9 is an electronic component 10, for instance a chip. In FIG. 2, encapsulating material 7 is applied on two sides of lead frame 9. It is however also possible to apply on only one side of a lead frame 9 (for instance a BGA), in which case the present invention is particularly advantageous. Ejector pins 8 are displaceable in the mould halves 2,3. During the encapsulating process the ejector pins 8 are withdrawn almost completely from mould cavity 5. Close to mould cavity 5 the ejector pins 8 are provided with a recess, preferably an annular groove 11 which encapsulating material 7 can enter and after curing functions as seal.

Figure 3:
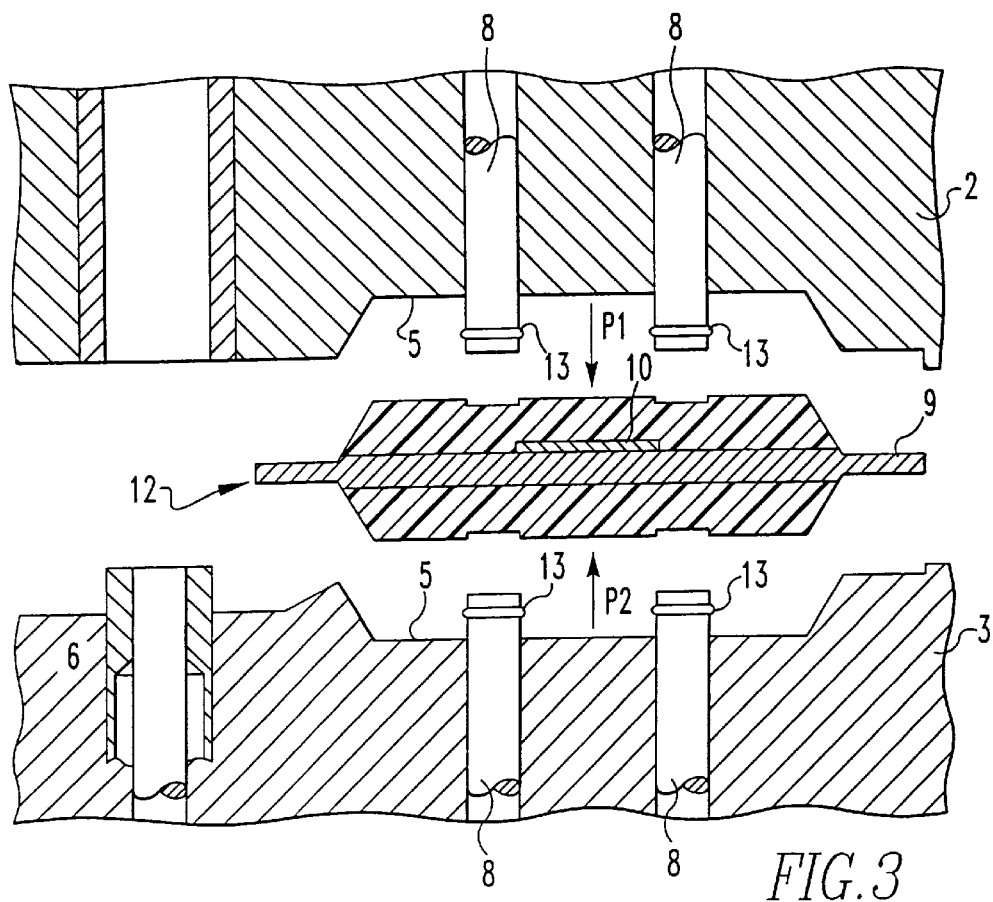
FIG. 3 shows a cross-section through a mould as shown in FIG. 2 after the encapsulating process.

FIG. 3 shows the part of the encapsulating device 1 shown in FIG. 2 after the encapsulating process is completed and encapsulating material 7 has cured. Mould halves 2,3 are moved apart and ejector pins 8 are moved as according to arrows P1, P2 relative to the respective mould halves 2,3. During displacement of ejector pins 8 relative to mould half 2,3 the encapsulated product 12 is released from the mould cavity walls 5. FIG. 2 also shows that ejector-pins 8 are provided with sealing edges 13 consisting of encapsulating material 7 which has cured in the annular grooves 11 of ejector pin 8.

Figure 4:
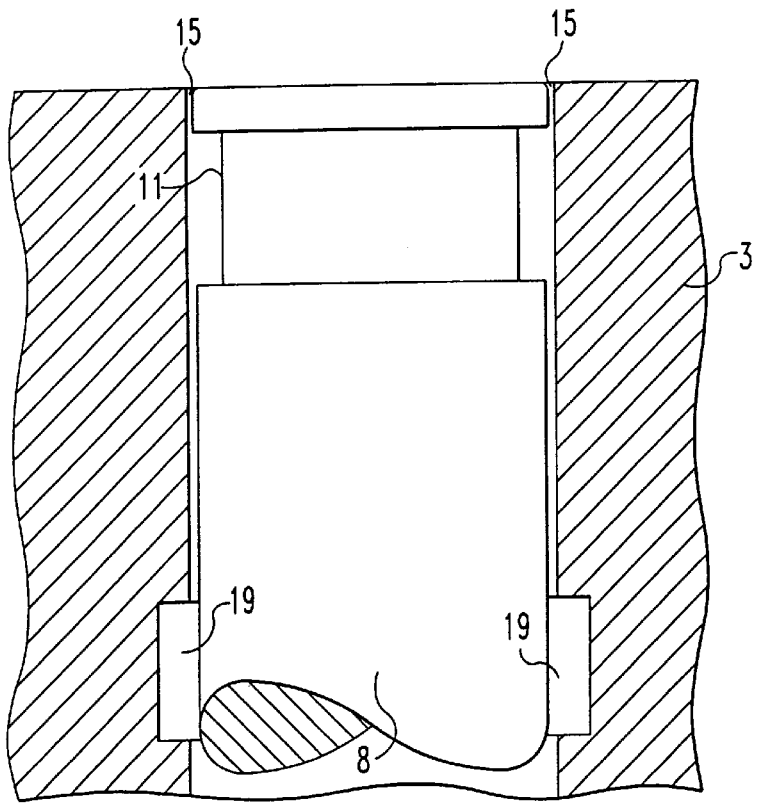
FIG. 4 shows a cross-section through a part of an ejector pin according to the invention.

FIG. 4 shows in detail a view of the active end of an ejector pin 8 in which an annular groove 11 is arranged which has not yet been filled with encapsulating material 7, i.e. the ejector pin 8 as shown in this figure has not yet been used in an encapsulating process. In mould half 3 is arranged an opening 14 through which the ejector pin 8 is guided and an annular groove 19 which encapsulating material can enter. Present between opening 14 and ejector pin 8 are interspaces 15 in the form of gaps whereby a limited quantity of encapsulating material can penetrate between the ejector pin 8 and the wall of the opening 14. The presence of interspaces 15 can never be wholly prevented due to the fact that ejector pin 8 must be axially movable in the opening 14 of mould half 3.

Figure 5:
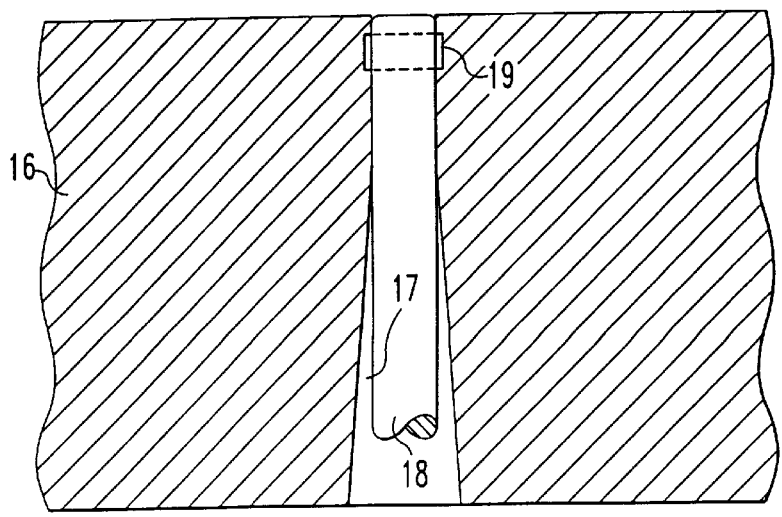
FIG. 5 shows a cross-section through an opening in a mould part according to the invention, in which opening is situated an ejector pin.

FIG. 5 shows a mould half 16 in which is arranged an opening 17, the upper part of which connects close-fittingly on an ejector pin 18. The upper part of opening 17 therefore forms the part which guides the ejector pin 18. In the wall of opening 17 is arranged a recess preferably an annular groove 19 which encapsulating material 7 can enter. Since annular groove 19 in FIG. 5 is not yet filled with encapsulating material, this means that mould half 16 has not yet been used for encapsulating products, as the annular groove 19 would then be filled with encapsulating material 7.

What is claimed is:

1. A mould part of a mould for encapsulating electronic components mounted on a carrier comprising:
   a mould part having a wall forming at least one cylindrical opening for guiding an ejector pin and at least one recess arranged in the wall of the opening;
   a cylindrical ejector pin having a side wall and at least one ejector pin recess arranged close to an end of the ejector pin which makes contact with a product for ejecting; and
   a self-regulating seal formed in the recess arranged in the wall of the opening by encapsulating material which has been received therein,
   wherein the ejector pin moves relative to the self-regulating seal.

2. The mould part of a mould for encapsulating electronic components mounted on a carrier as claimed in claim 1, wherein the ejector pin recess is an annular groove arranged adjacent the end of the ejector pin.

3. The mould part of a mould for encapsulating electronic components mounted on a carrier as claimed in claim 2, wherein the ejector pin recess is the annular groove and an interspace running from the annular groove to the end of the ejector pin making contact with a product for ejecting.

4. The mould part of a mould for encapsulating electronic components mounted on a carrier as claimed in claim 1, wherein the wall of the opening forms at least one channel which connects the annular groove to the surface of the mould part at least partially co-defining a mould cavity.

5. The mould part of a mould for encapsulating electronic components mounted on a carrier as claimed in claim 1 wherein the ejector pin recess is configured to receive encapsulating material so as to form a seal.

* * * * *